United States Patent
Lee et al.

(10) Patent No.: US 9,650,263 B2
(45) Date of Patent: May 16, 2017

(54) SEPARATION MEMBRANE HAVING EXCELLENT ANTIFOULING PROPERTIES FOR WATER TREATMENT AND MANUFACTURING METHOD THEREOF

(71) Applicant: LG CHEM, LTD., Seoul (KR)

(72) Inventors: Young-Ju Lee, Daejeon (KR); Joung-Eun Yoo, Daejeon (KR); Chong-Kyu Shin, Daejeon (KR); Jae-Hong Kim, Daejeon (KR); Phill Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 551 days.

(21) Appl. No.: 14/197,207

(22) Filed: Mar. 4, 2014

(65) Prior Publication Data

US 2014/0251892 A1 Sep. 11, 2014

Related U.S. Application Data

(63) Continuation-in-part of application No. PCT/KR2013/008185, filed on Sep. 10, 2013.

(30) Foreign Application Priority Data

Mar. 7, 2013 (KR) .......................... 10-2013-0024482
Sep. 10, 2013 (KR) .......................... 10-2013-0108428

(51) Int. Cl.
*B01D 39/00* (2006.01)
*B01D 39/14* (2006.01)
(Continued)

(52) U.S. Cl.
CPC .............. *C02F 1/441* (2013.01); *B01D 61/02* (2013.01); *B01D 61/12* (2013.01); *B01D 63/10* (2013.01);
(Continued)

(58) Field of Classification Search
CPC .. B01D 67/0093; B01D 69/125; B01D 71/56; B01D 2323/30; B01D 2323/02; B01D 61/025
See application file for complete search history.

(56) References Cited

U.S. PATENT DOCUMENTS 4,277,344 A * 7/1981 Cadotte ................ B01D 69/125
210/490
6,913,694 B2 * 7/2005 Koo .................... B01D 67/0088
210/490
(Continued)

FOREIGN PATENT DOCUMENTS

KR 10-2003-0089842 A 11/2003
KR 10-0474169 B1 3/2005
(Continued)

OTHER PUBLICATIONS

Office Action from Korean Patent Office for Application No. 10-2014-0092515, dated Oct. 15, 2015.
(Continued)

*Primary Examiner* — Ana Fortuna

(57) ABSTRACT

A water treatment separation membrane includes a support having pores, a polyamide layer formed on the support, and a passivation layer formed on the polyamide layer by using an aqueous solution including an amine-containing compound, an epoxy-containing compound and a fluorine-containing compound.

18 Claims, 2 Drawing Sheets

(51) Int. Cl.
  *B01D 71/56*   (2006.01)
  *B01D 63/00*   (2006.01)
  *B01D 67/00*   (2006.01)
  *C02F 1/44*    (2006.01)
  *B01D 61/02*   (2006.01)
  *B01D 61/12*   (2006.01)
  *B01D 65/08*   (2006.01)
  *B01D 63/10*   (2006.01)
  *C02F 103/08*  (2006.01)

(52) U.S. Cl.
  CPC ......... *B01D 65/08* (2013.01); *B01D 67/0088* (2013.01); *B01D 67/0093* (2013.01); *B01D 71/56* (2013.01); *C02F 2103/08* (2013.01); *C02F 2303/20* (2013.01)

(56) References Cited

U.S. PATENT DOCUMENTS

| | | |
|---|---|---|
| 2003/0121844 A1 | 7/2003 | Koo et al. |
| 2007/0175820 A1 | 8/2007 | Koo et al. |
| 2008/0237118 A1 | 10/2008 | Moon et al. |
| 2011/0284458 A1 | 11/2011 | Mickols et al. |
| 2013/0284665 A1 | 10/2013 | Lee et al. |
| 2014/0251892 A1* | 9/2014 | Lee ................. B01D 63/10 210/321.6 |

FOREIGN PATENT DOCUMENTS

| | | |
|---|---|---|
| KR | 10-2010-0083700 A | 7/2010 |
| KR | 10-2012-0022414 A | 3/2012 |
| KR | 10-1230843 B1 | 2/2013 |
| WO | WO 2010-082710 A1 | 7/2010 |

OTHER PUBLICATIONS

Office Action from Chinese Patent Office for Applicationn No. 201380003410.5, dated Sep. 14, 2015.

Office Action for Korean Application No. 10-2014-0092515, dated Apr. 27, 2016.

Office Action for Chinese Application No. 201380003410.5, dated May 13, 2016.

Office Action from Korean Patent Office for Application No. 10-2014-0092515, dated Jul. 26, 2016.

Guodong Kang et al., "A novel method of surface modification on thin-film composite reverse osmosis membrane by grafting poly-(ethylene glycol)", Polymer, Feb. 16, 2007, pp. 1165-1170, vol. 48, No. 5, Elsevier Ltd.

Elizabeth M. Van Wagner et al., "Surface modification of commercial polyamide desalination membranes using poly(ethylene glycol) diglycidyl ether to enhance membrane fouling resistance", Journal of Membrane Science, Feb. 1, 2011, pp. 273-287, vol. 367, Elsevier B.V.

Xueting Zhao et al., "Grafting perfluoroalkyl groups onto polyacrylonitrile membrane surface for improved fouling release property", Journal of Membrane Science, Oct. 1, 2012, pp. 824-834, vol. 415-416, Elsevier B.V.

Extended European Search Report for European Application No. 13831885.2 dated Nov. 4, 2016.

* cited by examiner

SEPARATION MEMBRANE HAVING EXCELLENT ANTIFOULING PROPERTIES FOR WATER TREATMENT AND MANUFACTURING METHOD THEREOF

CROSS-REFERENCE TO RELATED APPLICATIONS

This application claims priority to Korean Patent Application Nos. 10-2013-0024482 filed on Mar. 7, 2013 and 10-2013-0108428 filed on Sep. 10, 2013, in the Korean Intellectual Property Office, as well as PCT/KR2013/008185 filed on Sep. 10, 2013, the disclosures of which are incorporated herein by reference.

BACKGROUND

Embodiments of the present invention relate to a polyamide water treatment separation membrane and a manufacturing method thereof, and more particularly, to a polyamide separation membrane having improved antifouling properties by forming a coating layer including specific compounds on a polyamide layer, and a manufacturing method thereof.

Osmosis occurs when two solutions of different concentrations are separated by a semipermeable membrane, and solvent flows from a solution having a lower concentration of solute through the membrane to another solution having a higher concentration of solute. The pressure applied to the solution having the higher concentration of the solute by the movement of the solution is known as osmotic pressure. When an external pressure higher than the osmotic pressure is applied to the higher concentration side, the solvent may move from the solution having the higher concentration of the solute to the solution having the lower concentration of the solute. This phenomenon is known as reverse osmosis. By using the principle of reverse osmosis, various salts and organic materials may be separated by the semipermeable membrane by using a pressure gradient as a driving force. A separation membrane is used for separating materials on the molecular level, removing salts from saline water and seawater, and providing water for domestic, commercial and industrial uses using the reverse osmosis phenomenon.

A polyamide membrane is an example of such a water treatment separation membrane. The polyamide membrane is manufactured by forming an active polyamide layer on a support having pores with a small pore size. The support having pores is formed by forming a polysulfone layer on a non-woven fabric. The polysulfone-coated non-woven fabric is then impregnated with an aqueous m-phenylenediamine (mPD) solution to form an mPD layer and the mPD layer is impregnated with a trimesoyl chloride (TMC) organic solution so that the mPD layer contacts the TMC to allow interfacial polymerization. As a result, a polyamide layer is formed on the support having pores.

Some commercial applications may require certain conditions to be met by a separation membrane. One of these conditions is a high salt rejection rate. A commercially required salt rejection rate for a water treatment separation membrane may be 97% or above with respect to brackish water. Other significant properties include high flux properties by which a relatively large amount of water may be transmitted under a relatively low pressure. In general, the preferred permeation flux of a membrane is known to be 10 gallons/ft$^2$-day (gfd) under a pressure of 800 psi for sea water, and 15 gfd or above under a pressure of 220 psi for saline water.

Recently, prevention of fouling of the separation membrane has been recognized as a potential area for improvement along with other characteristics, such as the salt rejection rate and the permeation flux. When a membrane is fouled, floating materials or dissolved materials may be attached to the surface of the membrane. When fouling occurs, permeation flux may be decreased due to the absorption and growth of microorganisms on the surface of the membrane. This may cause secondary pollution, such as forming a biofilm on the surface of the separation membrane. Since a polluted separation membrane has decreased permeation properties, frequent corrections of the pressure may be necessary to maintain a constant permeation flux. When the fouling of the membrane is severe, a cleaning process may be required.

SUMMARY OF THE INVENTION

Embodiments of the present invention relate to a polyamide water treatment separation membrane having excellent antifouling properties by forming a passivation layer using an aqueous solution including specific compounds on a polyamide layer. An embodiment of the present invention is a separation membrane that may be used for water treatment.

In an embodiment, the separation membrane may include a support having pores, a polyamide layer formed on the support, and a passivation layer formed on the polyamide layer using an aqueous solution including an amine-containing compound, an epoxy-containing compound and a fluorine-containing compound.

In an embodiment, the separation membrane includes a support having pores, a polyamide layer formed on the support, and a passivation layer formed on the polyamide layer, the passivation layer including at least one compound represented by the following Chemical Formulae 6 and 7:

[Chemical Formula 6]

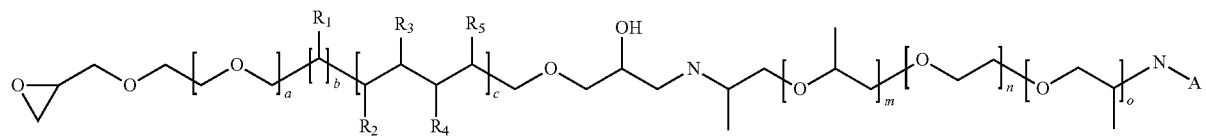

[Chemical Formula 7]

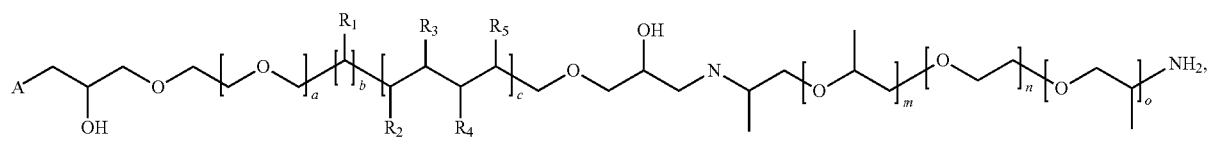

in which A is a fluorine-substituted compound selected from the group consisting of $C_{1-20}$ alkylene, aryl alkylene, alkylene oxide, alkenylene, aryl alkenylene, and alkenyl oxide; R1 is hydrogen or a hydroxyl group; each of R2, R3, R4, and R5 is independently hydrogen, a hydroxyl group, or an alkoxyalkyl oxirane group; a is an integer from 0 to 150, preferably from 3 to 150, and more preferably from 3 to 50; b is an integer from 0 to 3, and preferably 0 or 1; c is an integer from 0 to 5, and preferably 0 or 1; m is an integer from 0 to 10; n is an integer from 0 to 15; and o is an integer from 0 to 10.

According to another aspect of the present invention, a method of manufacturing a water treatment separation membrane includes providing a support having pores including a polyamide layer formed thereon, and forming a passivation layer on the polyamide layer by using an aqueous solution including an amine-containing compound, an epoxy-containing compound, and a fluorine-containing compound.

In one embodiment, the aqueous solution may include 0.01 to 0.6 mol % of the amine-containing compound, 0.01 to 2.0 mol % of the epoxy-containing compound, 0.001 to 0.4 mol % of the fluorine-containing compound, and a remainder of a solvent.

In an embodiment, the amine-containing compound may be a compound including amino groups at both terminals thereof. More specifically, polyalkylene glycol including amino groups at both terminals thereof may be used.

In an embodiment, the epoxy-containing compound may be one or more water soluble compounds including at least two epoxy groups such as a polyethylene epoxy resin, a polyglycerin epoxy resin and a polysorbitol epoxy resin.

The fluorine-containing compounds may be a fluorine-substituted compound selected from the group consisting of $C_{1-20}$ alkylene, aryl alkylene, alkylene oxide, alkenylene, aryl alkenylene, and alkenyl oxide.

In an embodiment, the fluorine-substituted compound may be at least one selected from the group consisting of $F(CF_2)_3O[CF(CF_3)CF_2O]_3CF(CF_3)COF$, $CHF_2CF_2CF_2CH_2OCH_2CHCH_2O$, $CHF_2CF_2CF_2CF_2CH_2OCH_2CHCH_2O$, $F(CH_2)_{10}COOH$, $F(CH_2)_7COCl$, $F(CH_2)_{10}CH_2CH_2OH$, $F(CH_2)_8CH_2CH_2OH$, $(CF_3)_2CCH_3COF$, $F(CF_2)_6CH_2CHCH_2O$, $CF_3CHCHCOCl$, and $F(CF_2)_6CH_2NH_2$.

By forming a passivation layer on the polyamide active layer using an aqueous solution including an amine-containing compound, an epoxy-containing compound and a fluorine-containing compound, a separation membrane according to an embodiment of the present invention exhibits excellent antifouling properties, thereby reducing effects of the fouling materials which can decrease the permeation flux of the separation membrane.

DETAILED DESCRIPTION

Hereinafter, embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Embodiments of the present invention include a water treatment separation membrane having good salt rejection rate and permeation flux properties, and excellent antifouling properties for many kinds of polluting materials. A water treatment separating membrane accomplishing the above-described properties may be manufactured by forming a passivation layer using an aqueous solution an amine-containing compound, an epoxy-containing compound and a fluorine-containing compound on a polyamide layer.

In an embodiment, a water treatment separation membrane includes a support having pores, a polyamide layer formed on the support, and a passivation layer formed on the polyamide layer by using an aqueous solution including an amine-containing compound, an epoxy-containing compound and a fluorine-containing compound.

Figure 1:
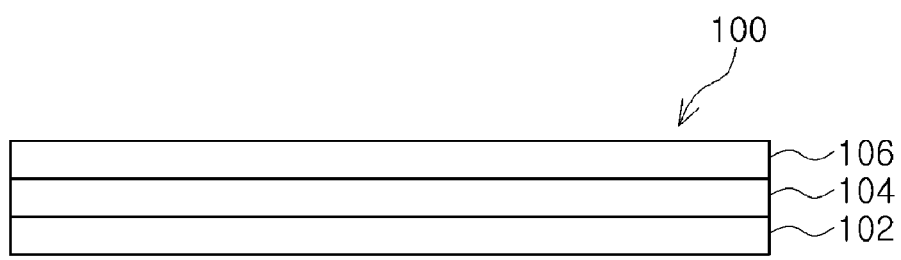
FIG. 1 illustrates a water treatment separation membrane including a support having pores, a polyamide layer, and a passivation layer.

For example, FIG. 1 illustrates a water treatment separation membrane 100 including a support having pores 102 (pores not shown), a polyamide layer 104, and a passivation layer 106.

The support having pores may be obtained by forming a layer of a polymer material on a non-woven fabric. The polymer material may include, for example, polysulfone, polyether sulfone, polycarbonate, polyethylene oxide, polyimide, polyetherimide, polyetheretherketone, polypropylene, polymethylpentene, polymethyl chloride, polyvinylidene fluoride and the like. However, the polymer material is not limited thereto. Among these materials, polysulfone is preferable in an embodiment.

The polyamide layer may be formed by an interfacial polymerization between an amine compound and an acyl halide compound. Examples of the amine compound include m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine and a mixture thereof. However, the amine compound is not limited thereto. In an embodiment, the acyl halide compound include one or more of trimesoyl chloride, isophthaloyl chloride, and terephthaloyl chloride. However, the acyl halide compound is not limited thereto.

A separation membrane according to an embodiment of the present invention includes a passivation layer on the polyamide layer, where the passivation layer is formed by using an aqueous solution including an amine-containing compound, an epoxy-containing compound and a fluorine-containing compound.

In an embodiment, amino terminal groups present at both terminals of the amine-containing compounds form covalent bonds with residual halide functional groups in the polyamide active layer. The resulting hydrophilic backbone may increase the fouling resistance of the water treatment separation layer. The amine-containing compound of an embodiment of the present invention may preferably be a compound having amino groups at both terminals, and more preferably be a polyalkylene glycol derivative with amino groups at both terminals. The polyalkylene glycol may be polyethylene glycol, polypropylene glycol, or the like.

For example, the amine-containing compound applicable in an embodiment of the present invention may be a compound represented by the following Chemical Formula 1.

[Chemical Formula 1]

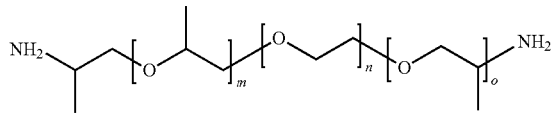

In Chemical Formula 1, m is an integer from 0 to 10, n is an integer from 0 to 15, and o is an integer from 0 to 10.

In an embodiment, the amine-containing compound may be a commercially available product. For example, JEFFAMINE® by Huntsman may be used. The aqueous solution may contain 0.01 to 0.6 mol %, and preferably 0.026 to 0.53 mol % or 0.026 to 0.3 mol % of the amine-containing compound, based on the total amount of the aqueous solution. When the amount of the amine-containing compound exceeds 0.6 mol %, the resulting increase in the thickness of the passivation layer may cause the permeation flux to decrease. When the amount of the amine-containing compound is less than 0.01 mol %, the antifouling properties may not be sufficient for some applications.

Epoxy groups present at both terminals of the epoxy-containing compound may react with the amine-containing compound to form a polymer with a longer chain length to improve the salt rejection rate of the separation membrane. After the polymerization, residual epoxy groups which had not reacted with the amino groups in the amine-containing compound may form covalent bonds with residual amino groups of the polyamide layer. Thus, a stable passivation layer may be formed on the polyamide layer due to the presence of covalent bonding. In addition, the epoxy group-containing compound may include a backbone having hydrophilic properties, which may increase the fouling resistance of the water treatment separation membrane. The epoxy-containing compound in an embodiment of the present invention may be a water-soluble compound having at least two epoxy groups attached thereto. Examples of the epoxy-containing compound include a polyethylene epoxy resin, a polyglycerin epoxy resin, a polysorbitol epoxy resin, and the like.

More preferably, the epoxy-containing compound applicable in an embodiment of the present invention may be a compound represented by the following Chemical Formula 2.

[Chemical Formula 2]

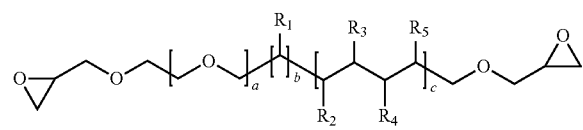

In Chemical Formula 2, $R_1$ is hydrogen or a hydroxyl group; each of $R_2$, $R_3$, $R_4$, and $R_5$ is independently hydrogen, a hydroxyl group, or an alkoxyalkyl oxirane group; a is an integer from 0 to 150, preferably from 3 to 150, more preferably from 3 to 50; b is an integer from 0 to 3, preferably 0 or 1; and c is an integer from 0 to 5, preferably 0 or 1.

More specifically, the epoxy-containing compound in an embodiment of the present invention may be, for example, at least one selected from the group consisting of a compound represented by the following Chemical Formulae 3 to 5.

[Chemical Formula 3]

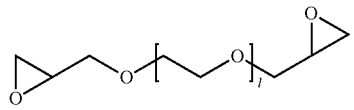

In Chemical Formula 3, l is an integer from 4 to 150.

[Chemical Formula 4]

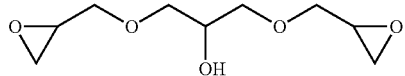

[Chemical Formula 5]

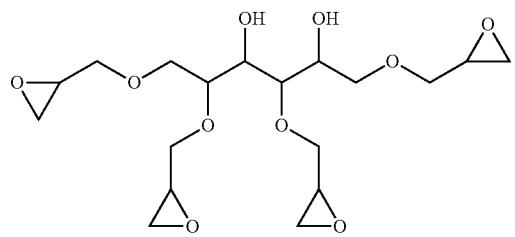

The aqueous solution may contain 0.01 to 2.0 mol %, and preferably 0.019 to 1.9 mol % or 0.019 to 1.0 mol % of the epoxy-containing compound, based on the total amount of the aqueous solution. Similar to the amine-containing compound, when the amount of the epoxy-containing compound exceeds 2.0 mol %, the increased thickness of the passivation layer may result in a substantial reduction in flux. On the other hand, when the amount of the epoxy-containing compound is less than 0.01 mol %, the effect in increasing the antifouling properties may not be adequate for some applications.

The molar ratio of the amine-containing compound to the epoxy-containing compound may be in the range from 3:1 to 1:4. When the ratio of the amine-containing compound to the epoxy-containing compound falls within the above range, the amine-containing compound may react to the epoxy-containing compound to increase the chain length of the material forming the passivation layer, and the salt rejection efficiency may be increased.

Next, the fluorine-containing compound is applied to improve the antifouling properties of the separation membrane. Examples of the fluorine-containing compound in an embodiment of the present invention may include fluorine-substituted $C_{1-20}$ alkylene, aryl alkylene, alkylene oxide, alkenylene, aryl alkenylene, alkenyl oxide, and the like. More specifically, fluorine-containing compounds such as $F(CF_2)_3O[CF(CF_3)CF_2O]_3CF(CF_3)COF$, $CHF_2CF_2CF_2CH_2OCH_2CHCH_2O$, $CHF_2CF_2CF_2CF_2CH_2OCH_2CHCH_2O$, $F(CH_2)_{10}COOH$, $F(CH_2)_7COCl$, $F(CH_2)_{10}CH_2CH_2OH$, $F(CH_2)_8CH_2CH_2OH$, $(CF_3)_2CCH_3COF$, $F(CF_2)_6CH_2CHCH_2O$, $CF_3CHCHCOCl$, $F(CF_z)_6CH_2NH_z$ and the like may be used. The aqueous solution may contain 0.001 to 0.4 mol %, and preferably 0.001 to 0.37 mol % or 0.001 to 0.2 mol % of the fluorine-containing compound, based on the total amount of the aqueous solution. When the amount of the fluorine-containing compound exceeds 0.4 mol %, dissolving the fluorine-containing compound in the aqueous solution may be difficult. On the other hand, when the amount of the fluorine-containing compound is less than 0.001 mol %, the antifouling effect may be insignificant.

Preferably, the aqueous solution includes 0.01 to 0.6 mol % of the amine-containing compound, 0.01 to 2.0 mol % of the epoxy-containing compound, and 0.001 to 0.4 mol % of the fluorine-containing compound, and a remainder of a solvent. In an embodiment, the solvent may be water. When the amount of the components in the aqueous solution falls within the above-described ranges, the chain length of the material forming the passivation layer may be appropriately controlled, and the fluorine-rich segments may be exposed at the outermost surface of the passivation layer. Thus, a membrane formed using the above ranges has a high permeation flux and salt rejection rate, while antifouling properties are enhanced.

In the aqueous solution, the solid content is preferably from 1 to 20%. When the solid content is less than 1%, the improvement in the antifouling effect may be insignificant. On the other hand, when the solid content exceeds 20%, a resulting increase in the thickness of the passivation layer may reduce the flux.

When a passivation layer is formed by using an aqueous solution including the amine-containing compound, the epoxy-containing compound and the fluorine-containing compound as described above, reactions between the amine-containing compound, the epoxy-containing compound and the fluorine-containing compound may produce a mixture of different compounds. For example, the passivation layer may include at least one compound represented by the following Chemical Formulae 6 and 7:

[Chemical Formula 6]

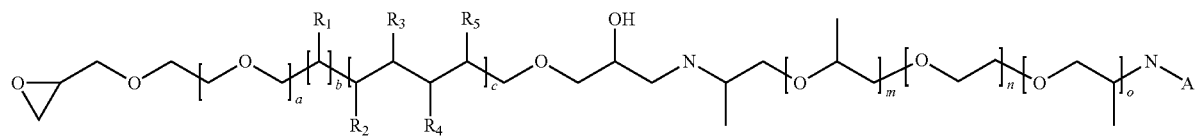

In Chemical Formula 6, A is a fluorine-substituted compound selected from the group consisting of $C_{1-20}$ alkylene, aryl alkylene, alkylene oxide, alkenylene, aryl alkenylene, and alkenyl oxide; $R_1$ is hydrogen or a hydroxyl group; each of $R_2$, $R_3$, $R_4$, and $R_5$ is independently hydrogen, a hydroxyl group, or an alkoxyalkyl oxirane group; a is an integer from 0 to 150, preferably from 3 to 150, more preferably from 3 to 50; b is an integer from 0 to 3, preferably 0 or 1; c is an integer of 0 to 5, preferably 0 or 1; m is an integer from 0 to 10; n is an integer from 0 to 15; and o is an integer from 0 to 10.

group, or an alkoxyalkyl oxirane group; a is an integer from 0 to 150, preferably from 3 to 150, more preferably from 3 to 50; b is an integer from 0 to 3, preferably 0 or 1; c is an integer from 0 to 5, preferably 0 or 1; m is an integer from 0 to 10; n is an integer from 0 to 15; and o is an integer from 0 to 10.

More specifically, in Chemical Formulae 6 and 7, A may be $F(CF_2)_3O[CF(CF_3)CF_2O]_3CF(CF_3)CO-$, $CHF_2CF_2CF_2CH_2OCH_2CHOHCH_2-$, $CHF_2CF_2CF_2CF_2CH_2OCH_2CHOHCH_2-$, $F(CH_2)_{10}CO-$, $F(CH_2)_7CO-$, $F(CH_2)_{10}CH_2CH_2O-$, $F(CH_2)_8CH_2CH_2O-$, $(CF_3)_2CCH_3CO-F(CF_2)_6CH_2CHOHCH_2-$, $CF_3CHCHCO-$, or $F(CF_2)_6CH_2NH-$.

The antifouling properties of the resulting separation membrane were evaluated, and it was found that the absorption of fouling materials onto the surface of the separation membrane was significantly reduced due to the oil repellency of fluorine groups attached onto the surface of the polyamide layer. Accordingly, a passivation layer according to an embodiment of the present invention improves antifouling properties of a membrane.

More particularly, the permeation flux of the water treatment separation membrane according to an embodiment of the present invention may decrease by 6% or less of a permeation flux when measured after 6 hours of adding a mixed aqueous solution of 32,000 ppm of NaCl and 100 ppm of casein under a pressure of 800 psi, indicating excellent antifouling properties.

A water treatment separation membrane according to an embodiment of the present invention may be formed by a manufacturing method including the following steps: providing a support having pores including a polyamide layer formed thereon, and forming a passivation layer on the polyamide layer using an aqueous solution including an amine-containing compound, an epoxy-containing compound and a fluorine-containing compound.

In an embodiment, the support having pores including the polyamide layer formed thereon may be a commercially available polyamide separation membrane or be made according to processes that are known in the art. For example, the support having pores may be formed by

[Chemical Formula 7]

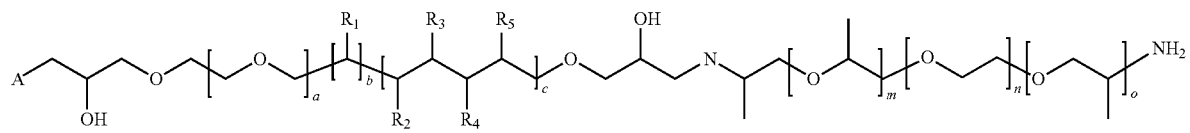

In Chemical Formula 7, A is a fluorine-substituted compound selected from the group consisting of $C_{1-20}$ alkylene, aryl alkylene, alkylene oxide, alkenylene, aryl alkenylene, and alkenyl oxide; $R_1$ is hydrogen or a hydroxyl group; each of $R_2$, $R_3$, $R_4$ and $R_5$ is independently hydrogen, a hydroxyl impregnating a support having pores with a m-phenylenediamine (mPD) aqueous solution to form an mPD layer, and then impregnating the mPD layer with a trimesoyl chloride (TMC) organic solution so that the mPD layer contacts the TMC. The subsequent interfacial polymerization produces an active polyamide layer. Alternatively, the active polyamide layer may be formed by a spray method or a coating method instead of an impregnation method.

The passivation layer may be formed on the polyamide layer by, for example, impregnating the support with the polyamide layer formed thereon with an aqueous solution including an amine-containing compound, an epoxy-containing compound and a fluorine-containing compound. Particular examples and amounts of each component in the aqueous solution may be the same as those described above.

The impregnating time may be appropriately controlled to obtain a passivation layer with a suitable thickness. The impregnating time, for example, may range from 0.1 minute to 10 hours, and more preferably from 1 minute to 1 hour. When the impregnating time is less than 0.1 minute, the passivation layer may not have sufficient thickness. On the other hand, when the impregnating time exceeds 10 hours, the thickness of the passivation layer may be too great. As a result, the permeation flux of the separation membrane for water treatment may be unacceptably decreased.

In an embodiment, after forming the passivation layer on the polyamide layer through the above-described processes, a washing process may be performed. The passivation layer may be washed with 3rd distilled water for 1 to 10 minutes, and preferably for 1 to 2 minutes each time. However, the washing time may be varied and is not limited thereto.

A separation membrane of an embodiment of the present invention may be used for micro filtration, ultra filtration, nano filtration, and reverse osmosis, etc. The separation membrane of an embodiment of the present invention is particularly suitable for reverse osmosis.

Embodiments of the present invention include a water treatment module including at least one of the water treatment separation membrane. Examples of the water treatment module of the present invention include, but are not limited to, a plate & frame module, a tubular module, a hollow & fiber module, a spiral wound module, and the like. The components and the manufacturing method of a water treatment module according to an embodiment of the present invention are not specifically limited so long as the water treatment module includes a water treatment separation membrane according to embodiments described herein. Apart from the water treatment membrane, the water treatment module can be any module known in the art.

Figure 2:
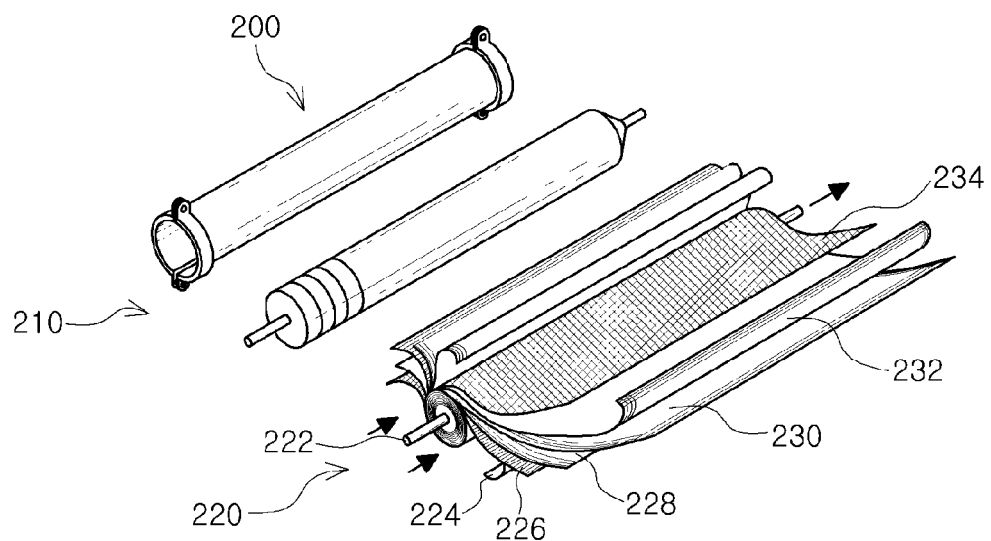
FIG. 2 illustrates an exploded view of an example of a water treatment module, including a module housing and a spiral filter.
Figure 3:
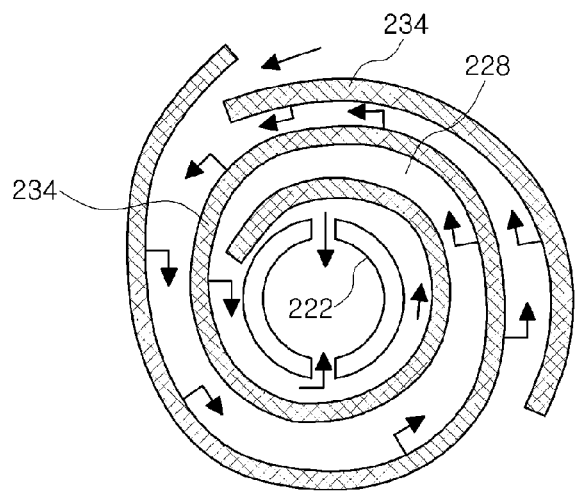
FIG. 3 illustrates a cross sectional view of the spiral filter of FIG. 2, including flow of permeate.

For example, FIG. 2 illustrates an exploded view of an example of a water treatment module 200 including a module housing 210, and a spiral filter 220. The water treatment module 200 houses a spiral filter 220 comprising a hollow perforated core 222 about which is wound with at least one layer of separation membranes and spacing material. The separation membrane and spacing material are arranged to form the multi-layered filter 220. The filter 220 comprises a separation membrane 224 that is supported by a backing 226 which is adhesively attached to a porous permeate carrier 228. The carrier 228 is adhesively attached to a second backing 230 that supports a second separation membrane 232. A mesh spacer 234 is placed over the second separation membrane 232 as the multi-layer filter is wound about the hollow perforated core 222. FIG. 3 illustrates a cross sectional view of the multi-layer filter and the core of FIG. 2.

A water treatment module according to an embodiment of the present invention may be used in a water treatment apparatus such as a domestic/industrial water purifying apparatus, a sewage treatment apparatus, a sea water/fresh water treatment apparatus, and the like. For example, FIG. 1 is a schematic system diagram of a water treatment apparatus.

Figure 4:
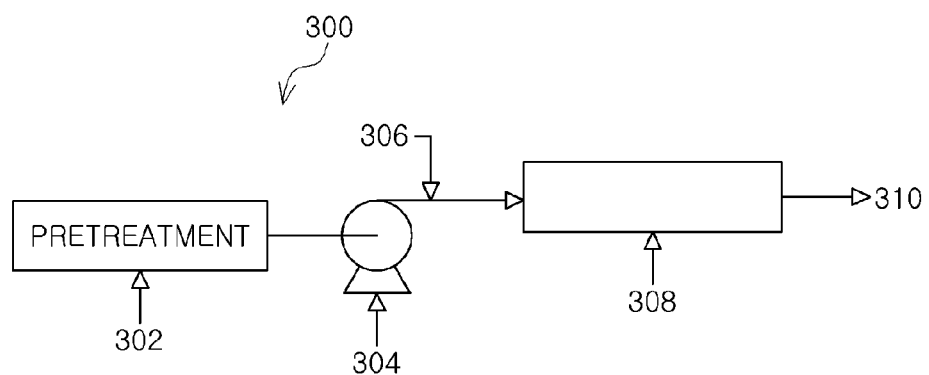
FIG. 4 illustrates a simplified schematic view of an example of a water treatment apparatus.

For example, FIG. 4 illustrates a simplified schematic view of an example of a water treatment apparatus 300. As shown FIG. 4, pretreated water 302 is supplied to a liquid pump 304 where the pressure of the flow is increased accordingly. Then, high pressure saline liquid 306 enters the water treatment module 308, and the discharge flow is converted from saline water to very saline water 310.

Hereinafter, embodiments of the present invention will be described in more detail.

Preparation Example

Forming Support Having Pores with Polyamide Layer 18 wt % of polysulfone in a solid form was added to a N,N-dimethylformamide (DMF) solution, and the resulting mixture was dissolved at 80° C. to 85° C. for 12 hours to obtain a homogeneous solution. The resulting solution was cast on a non-woven fabric of a polyester material having a thickness of 95 to 100 µm to form a 150 µm-thick polysulfone layer. Then, the cast non-woven fabric was immersed in water to forma porous polysulfone support.

The thus formed porous polysulfone support was immersed in an aqueous solution including 2 wt % of m-phenylenediamine for 2 minutes and was removed from the solution. The excess aqueous solution was removed by using a roller having a pressure of 25 psi, and the support was then dried at room temperature for 1 minute.

Then, the support was immersed in a 0.1 wt % of trimesoyl chloride organic solution including an ISOL-C (SK Chem.) solvent for 1 minute. The support was removed and dried in an oven at 60° C. for 10 minutes. Afterwards, the support was washed using a 0.2 wt % sodium carbonate aqueous solution at room temperature for 2 hours, and then washed using distilled water to obtain a support having pores including a polyamide layer with a thickness of 200 nm.

Example 1

0.026 mol % of JEFFAMINE® was dissolved in deionized water (DIW), and 0.024 mol % of $F(CF_2)_3O[CF(CF_3)CF_2O]_3CF(CF_3)COF$ was added to the solution. Next, 0.095 mol % of polyethylene glycol diglycidyl ether (PEGDE) was added to the solution, resulting in an aqueous solution (I) for forming a passivation layer.

In this Example, the weight average molecular weight of the PEGDE was 526, and the weight average molecular weight of the JEFFAMINE® was 1,900. The solid content of the aqueous polymer solution was 1.2 wt %.

The support having pores including the polyamide layer formed thereon according to the Preparation Example was impregnated with the aqueous solution (I) for 1 minute. Afterwards, the support was washed three times using distilled water to form a passivation layer.

Example 2

A passivation layer was formed by conducting the same procedure described in Example 1 except that 0.048 mol % of $F(CF_2)_3O[CF(CF_3)CF_2O]_3CF(CF_3)COF$ was added, and the solid content of the aqueous polymer solution was 1.4 wt %.

Example 3

A passivation layer was formed by conducting the same procedure described in Example 1 except that 0.072 mol % of $F(CF_2)_3O[CF(CF_3)CF_2O]_3CF(CF_3)COF$ was added, and the solid content of the aqueous polymer solution was 1.6 wt %.

Example 4

A passivation layer was formed by conducting the same procedure described in Example 1 except that 0.096 mol % of $F(CF_2)_3O[CF(CF_3)CF_2O]_3CF(CF_3)COF$ was added, and the solid content of the aqueous polymer solution was 1.8 wt %.

Example 5

A passivation layer was formed by conducting the same procedure described in Example 1 except that 0.0125 mol % of $CHF_2CF_2CF_2CF_2CH_2OCH_2CHCH_2O$ was added instead of 0.024 mol % of $F(CF_2)_2O[CF(CF_2)CF_2O]_2CF(CF_2)COF$, and the solid content of the aqueous polymer solution was 1.03 wt %.

Example 6

A passivation layer was formed by conducting the same procedure described in Example 5 except that 0.029 mol % of $CHF_2CF_2CF_2CF_2CH_2OCH_2CHCH_2O$ was added, and the solid content of the aqueous polymer solution was 1.07 wt %.

Example 7

A passivation layer was formed by conducting the same procedure described in Example 5 except that 0.042 mol % of $CHF_2CF_2CF_2CF_2CH_2OCH_2CHCH_2O$ was added, and the solid content of the aqueous polymer solution was 1.1 wt %.

Example 8

A passivation layer was formed by conducting the same procedure described in Example 3 except that 0.037 mol % instead of 0.026 mol % of JEFFAMINE® was used, and 0.12 mol % instead of 0.095 mol % of PEDGE was used.

Example 9

A passivation layer was formed by conducting the same procedure described in Example 3 except that 0.047 mol % instead of 0.026 mol % of JEFFAMINE® was used, and 0.019 mol % instead of 0.095 mol % of PEDGE was used.

Example 10

A passivation layer was formed by conducting the same procedure described in Example 6 except that 0.037 mol % instead of 0.026 mol % of JEFFAMINE® was used, and 0.057 mol % instead of 0.095 mol % of PEDGE was used.

Example 11

A passivation layer was formed by conducting the same procedure described in Example 6 except that 0.047 mol % instead of 0.026 mol % of JEFFAMINE® was used, and 0.019 mol % instead of 0.095 mol % of PEDGE was used.

Comparative Example 1

The separation membrane formed in the Preparation Example was washed using a 0.2 wt % of sodium carbonate aqueous solution at room temperature for 2 minutes, washed using distilled water for 1 minute, and then dried.

Comparative Example 2

A passivation layer was formed by conducting the same procedure described in Example 1 except that the fluorine-containing compound was excluded.

Comparative Example 3

A passivation layer was formed by conducting the same procedure described in Example 1 except that the epoxy-containing compound was excluded.

Experimental Example

Evaluation of Antifouling Properties

The antifouling properties of the separation membranes prepared in Examples 1 to 11 and Comparative Examples 1 to 3 were evaluated by the following method. The evaluation of the antifouling properties was conducted by using an aqueous mixture solution of 32,000 ppm of NaCl and 100 ppm of casein under a pressure of 800 psi. Initial salt rejection and permeation flux were measured, and the 100 ppm of casein was added to the aqueous mixture. After operating for 6 hours, the salt rejection and the flux were measured again. The measured results are summarized in Table 1.

TABLE 1

|  | Initial flux measured immediately after adding casein (GFD) | Flux measured 6 hours after adding casein (GFD) | Salt rejection measured immediately after adding casein (%) | Salt rejection measured 6 hours after adding casein (%) |
|---|---|---|---|---|
| Example 1 | 39.57 | 36.21 | 99.31 | 99.38 |
| Example 2 | 40.11 | 36.05 | 99.35 | 99.53 |
| Example 3 | 40.89 | 37.28 | 99.37 | 99.62 |
| Example 4 | 37.15 | 31.58 | 99.42 | 99.65 |
| Example 5 | 40.95 | 37.26 | 99.36 | 99.54 |
| Example 6 | 41.01 | 37.70 | 99.38 | 99.59 |
| Example 7 | 38.16 | 33.58 | 99.40 | 99.61 |
| Example 8 | 39.57 | 36.25 | 99.34 | 99.63 |
| Example 9 | 39.78 | 36.20 | 99.38 | 99.65 |
| Example 10 | 40.47 | 37.19 | 99.31 | 99.61 |
| Example 11 | 39.73 | 36.27 | 99.37 | 99.64 |
| Comparative Example 1 | 48.05 | 35.06 | 98.17 | 99.12 |
| Comparative Example 2 | 41.58 | 32.57 | 99.27 | 99.48 |
| Comparative Example 3 | 42.01 | 33.16 | 99.19 | 99.35 |

As illustrated in Table 1, separation membranes including passivation layers according to Examples 1 to 11 exhibit a smaller decrease in flux after adding casein than the Comparative Examples, indicating improved antifouling properties.

In addition, comparing the flux properties and the salt rejection rates of Examples 3, 8 and 9 and the flux properties and the salt rejection rates of Examples 6, 10 and 11, the salt rejection rates measured 6 hours after adding casein were found to be somewhat increased while maintaining the flux decreasing degree at the same level, when the polymerization degree is increased at a high amine compound ratio by controlling the wt % of the amine compound and the epoxy compound.

While the present invention has been shown and described in connection with the exemplary embodiments, it will be apparent to those skilled in the art that modifications and variations can be made without departing from the spirit and scope of the invention as defined by the appended claims.

What is claimed is:

1. A water treatment separation membrane comprising:
   a support having pores;
   a polyamide layer formed on the support; and
   a passivation layer formed on the polyamide layer by using an aqueous solution including an amine-containing compound, an epoxy-containing compound, and a fluorine-containing compound,
   wherein the amine-containing compound is polyalkylene glycol including amino groups at both terminals thereof.

2. The water treatment separation membrane of claim 1, wherein the aqueous solution includes:
   0.01 to 0.6 mol % of the amine-containing compound;
   0.01 to 2.0 mol % of the epoxy-containing compound;
   0.001 to 0.4 mol % of the fluorine-containing compound; and
   a remainder of a solvent.

3. The water treatment separation membrane of claim 1, wherein the polyalkylene glycol is polyethylene glycol or polypropylene glycol.

4. The water treatment separation membrane of claim 1, wherein the amine-containing compound is a compound represented by the following Chemical Formula 1:

[Chemical Formula 1]

in which m is an integer from 0 to 10,
n is an integer from 0 to 15, and
o is an integer from 0 to 10.

5. The water treatment separation membrane of claim 1, wherein the epoxy-containing compound includes two or more epoxy groups, and wherein the epoxy resin is selected from a group consisting of a polyethylene epoxy resin, a polyglycerin epoxy resin and a polysorbitol epoxy resin.

6. The water treatment separation membrane of claim 1, wherein the epoxy-containing compound is a compound represented by the following Chemical Formula 2:

[Chemical Formula 2]

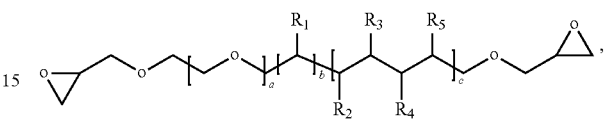

in which $R_1$ is hydrogen or a hydroxyl group,
each of $R_2$, $R_3$, $R_4$, and $R_5$ is independently hydrogen, a hydroxyl group, or an alkoxyalkyl oxirane group,
a is an integer from 0 to 150,
b is an integer from 0 to 3, and
c is an integer from 0 to 5.

7. The water treatment separation membrane of claim 1, wherein a molar ratio of the amine-containing compound to the epoxy-containing compound in the aqueous solution ranges from about 3:1 to about 1:4.

8. The water treatment separation membrane of claim 1, wherein the fluorine-containing compound is at least one selected from the group consisting of $F(CF_2)_3O[CF(CF_3)CF_2O]_3CF(CF_3)COF$, $CHF_2CF_2CF_2CH_2OCH_2CHCH_2O$, $CHF_2CF_2CF_2CF_2CH_2OCH_2CHCH_2O$, $F(CH_2)_{10}COOH$, $F(CH_2)_7COCl$, $F(CH_2)_{10}CH_2CH_2OH$, $F(CH_2)_8CH_2CH_2OH$, $(CF_3)_2CCH_3COF$, $F(CF_2)_6CH_2CHCH_2O$, $CF_3CHCHCOCl$ and $F(CF_2)_6CH_2NH_2$.

9. A water treatment module comprising the water-treatment separation membrane according to claim 1.

10. A water treatment apparatus comprising the water treatment module of claim 9.

11. A water treatment separation membrane comprising:
    a support having pores;
    a polyamide layer formed on the support; and
    a passivation layer formed on the polyamide layer, the passivation layer including an amine-containing compound, an epoxy-containing compound, and a fluorine-containing compound, the fluorine-containing compound including at least one compound represented by the following Chemical Formulae 6 or 7:

[Chemical Formula 6]

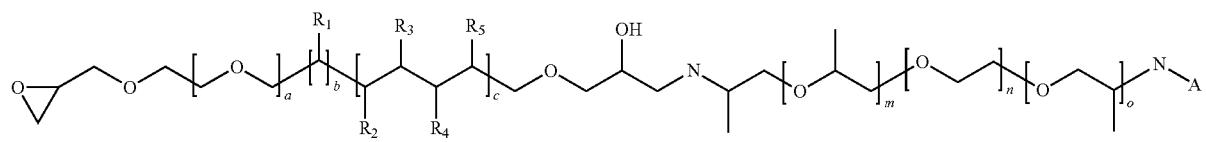

[Chemical Formula 7]

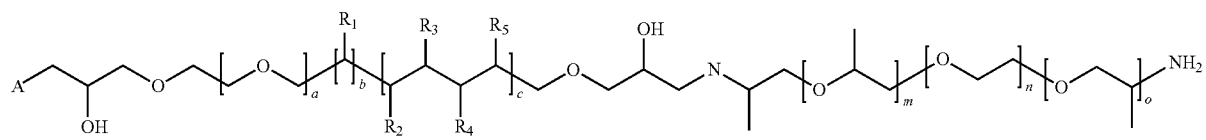

in which A is a fluorine-substituted compound selected from a group consisting of $C_{1-20}$ alkylene, aryl alkylene, alkylene oxide, alkenylene, aryl alkenylene and alkenyl oxide;

$R_1$ is hydrogen or a hydroxyl group;

each of $R_2$, $R_3$, $R_4$, and $R_5$ is independently hydrogen, a hydroxyl group or an alkoxyalkyl oxirane group;

a is an integer from 0 to 150, b is an integer from 0 to 3, c is an integer from 0 to 5, m is an integer from 0 to 10, n is an integer from 0 to 15, and o is an integer from 0 to 10, wherein the amine-containing compound is polyalkylene glycol having amino groups at first and second terminals thereof.

12. The water treatment separation membrane of claim 9, wherein A is $F(CF_2)_3O[CF(CF_3)CF_2O]_3CF(CF_3)CO—$, $CHF_2CF_2CF_2CH_2OCH_2CHOHCH_2—$, $CHF_2CF_2CF_2CF_2CH_2OCH—CHOHCH_2—$, $F(CH_2)_{10}CO—$, $F(CH_2)_7CO—$, $F(CH_2)_{10}CH_2CH_2O—$, $F(CH_2)_8CH_2CH_2O—$, $(CF_3)_2CCH_3CO—$, $F(CF_2)_6CH_2CHOHCH_2—$, $CF_3CHCHCO—$ or $F(CF_2)_6CH_2NH—$.

13. A water treatment module comprising the water treatment separation membrane according to claim 11.

14. A water treatment apparatus comprising the water treatment module of claim 13.

15. A method of manufacturing a water-treatment separation membrane, the method comprising:
providing a support having pores;
forming a polyamide layer on the support; and
forming a passivation layer on the polyamide layer by using an aqueous solution including an amine-containing compound, an epoxy-containing compound, and a fluorine-containing compound,
wherein the amine-containing compound is polyalkylene glycol having amino groups at first and second terminals thereof.

16. The method of claim 15, wherein the aqueous solution comprises 0.01 to 0.6 mol % of the amine-containing compound, 0.01 to 2.0 mol % of the epoxy-containing compound, and 0.001 to 0.4 mol % of the fluorine-containing compound, and a remainder of a solvent.

17. The method of claim 15, wherein the passivation layer is covalently bonded to the polyamide layer.

18. The method of claim 15, wherein the epoxy-containing compound is an epoxy resin having two or more epoxy groups, and wherein the epoxy resin is selected from a group consisting of a polyethylene epoxy resin, a polyglycerin epoxy resin and a polysorbitol epoxy resin.

* * * * *